MUFFLER CLAMP DEVICE

BACKGROUND OF THE INVENTION

1. Field of the Invention

This invention relates to clamp devices and more particularly to clamp devices for vehicle muffler components.

2. Description of the Prior Art

The prior art practice in connecting a muffler to an exhaust pipe is to insert the end of the exhaust pipe into the muffler sleeve. The connection is secured by a clamp which comprises a U bolt and a saddle shaped bar which encircles the muffler sleeve and tightened thereagainst by nut members. The prior art clamp device tightening action is in a plane, directed radially against the muffler sleeve and the tail pipe connected thereto. Because the U bolt tightening action is only against the outer sleeve which in turn compresses against the pipe end inserted into the sleeve, vibration, heat, rust and corrosion will cause the connection to loosen ultimately resulting in leakage, breakage and eventually, total separation.

SUMMARY OF THE INVENTION

Accordingly, I have invented a clamp device for connecting a vehicle muffler to a tail pipe which prevents the untimely destruction of such connections. My invention comprises an economical clamp device which clamps against the muffler sleeve and the tail pipe at two longitudinally spaced parallel planes. The clamp locations are fixed in such spaced relationship to separately support the connecting ends in their proper relative position.

Other objects and advantages of my invention will become more apparent after a careful study of the following detailed description taken together with the accompanying drawings which illustrate a preferred embodiment of my invention.

DESCRIPTION OF THE PREFERRED EMBODIMENT

Figure 1:
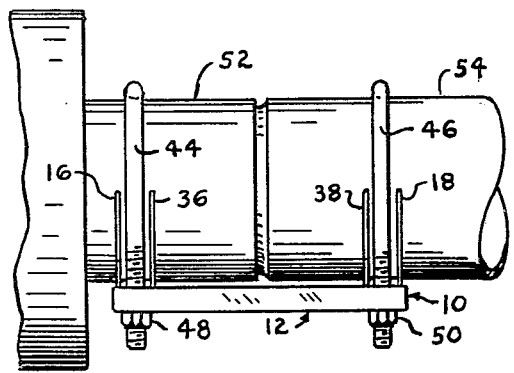
FIG. 1 is a side elevation of the clamp device of my invention shown in operative relation with a muffler sleeve and tail pipe which are shown in fragment.
Figure 3:
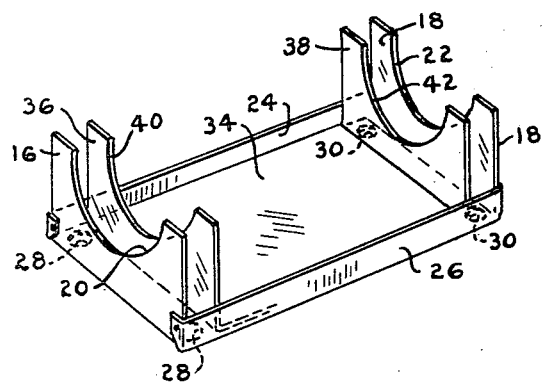
FIG. 3 is a perspective view of the saddle member of the clamp device.
Figure 2:
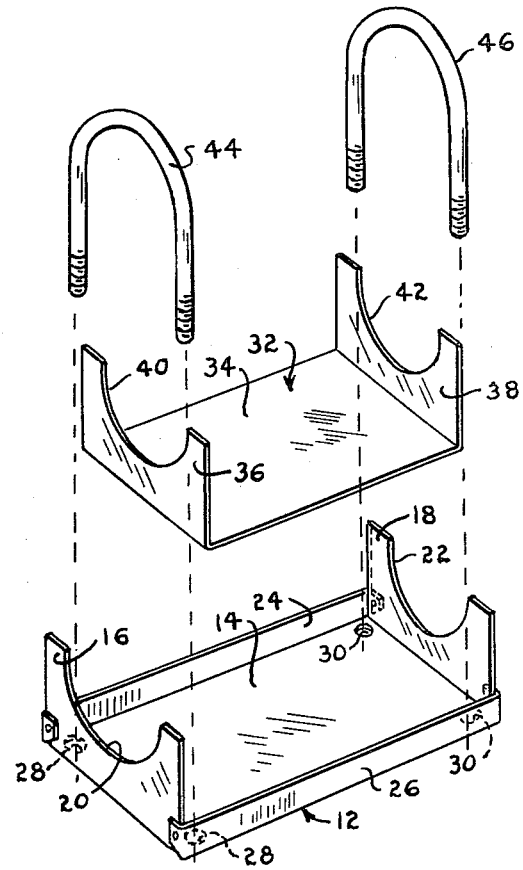
FIG. 2 is a perspective view of the component parts of the clamp device of this invention shown in exploded relation.
Figure 4:
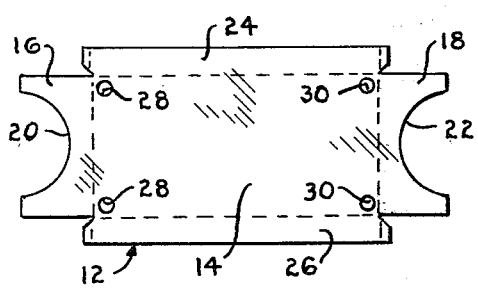
FIG. 4 is a plan elevation of a layout blank for forming the outer plate of the saddle member, the dotted lines represent the perimeter of the outer plate along which the ends and sides are angled upright.
Figure 5:
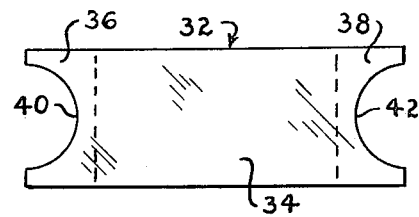
FIG. 5 is a plan elevation of a layout blank of the inside plate of the saddle member, the dotted lines represent the perimeter along which the ends are angled upright.

Referring now more particularly to the drawings wherein is illustrated a preferred embodiment of this invention, reference numeral 10 designates generally my invention. It comprises an outer and inner saddle plate 12 and 32. Saddle plate 12 is formed from a substantially rectangular metal sheet 14 having upstanding end members 16 and 18. The top of members 16 and 18 are formed contoured to provide longitudinally aligned semi-circular seating surfaces 20 and 22, respectively. Upright side edges 24 and 26 extend along both sides of plate 14 and formed to connect to upstanding end members 16 and 18 to thereby function as supports and stiffening means for ends 16 and 18 and the body of metal sheet 14. Provided adjacent each end of outer plate 14 are holes 28 and 30. Inner saddle plate 32 is formed from a rectangular metal sheet 34 having upstanding end members 36 and 38. Upstanding end members 36 and 38 are similarly contoured to provide longitudinally aligned semi-circular seating surfaces 40 and 42, respectively. Inner saddle plate 32 is longitudinally shorter than outer saddle plate 12, and is fixed to the outer saddle plate 12 by weldments or any other convenient method so that their corresponding body parts 34 and 14 respectively are planularly contiguous. Inner saddle member 32 is longitudinally centered thereon to expose holes 28 and 30 in saddle member 12 between upright members 16 and 36 and 18 and 38. Semi-circular seating surfaces 20 and 22 of outer saddle member 12 are longitudinally aligned with the semi-circular seating surfaces 40 and 42 of inner saddle member 32. Threaded ends of U bolts 44 and 46 are inserted in holes 28 and 30 of outer saddle member 12 to complete the circular passageway formed with upright members 16, 40 and 18, 38. Nut members 48 and 50 are connected to the threaded ends of U bolts 44 and 46, respectively.

In the operation of this invention, outer and inner saddle members 12 and 32 are connected together as above described to form an integral rigid member. U bolts 44 and 46 are inserted in holes 28 and 30 respectively of outer saddle plate 12. U bolts 44 and 46 are fixed spaced apart so that U bolt 44 and upright ends 16 and 36 encircle muffler sleeve 52. U bolt 46 and upright ends 18 and 38 being fixed longitudinally spaced from U bolt 44 encircle tail pipe 54. Tightening nuts 48 and 50 onto U bolts 44 and 46 will secure their connection to muffler sleeve 52 and tail pipe 54 relative to each other and also relative to the clamp decive 10 of this invention. By thus eliminating relative movement between muffler sleeve 52 and tail pipe 54, my invention will be effective no prolong the life of the muffler and tail pipe connection.

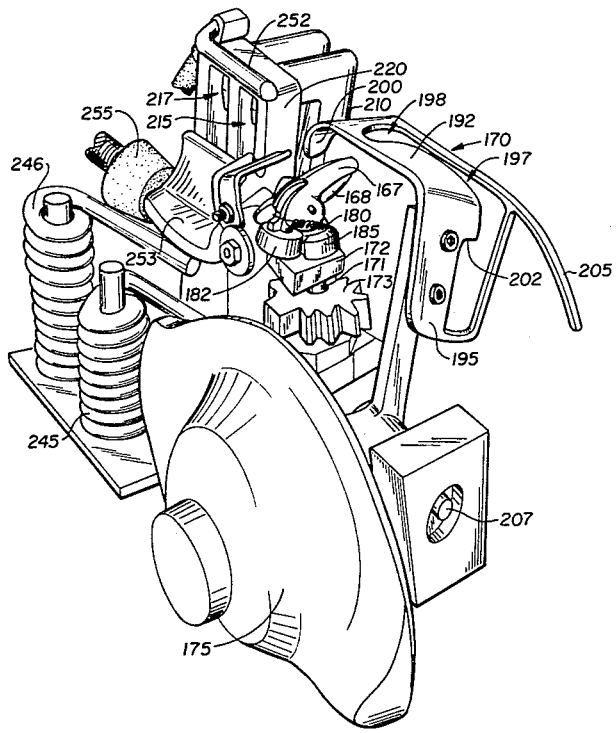

I claim:

1. A clamp device comprising:
   a plate member having upstanding ends;
   a second plate member having upstanding ends, said second plate member being mounted cradle fashion on said first plate member, said upstanding ends of said second plate member being spaced inwardly from said upstanding ends of said first named plate member, said first plate member having holes between said upstanding ends of said first and second plate members; and
   U bolt members inserted in said holes between said upright members of said first and second plate members.

2. A clamp device comprising:
   a plate member having upstanding ends and upstanding sides;
   a second plate member having upstanding ends, said second plate member being mounted cradle fashion on said first plate member, said upstanding ends of said second plate member being spaced inwardly from said upstanding ends of said first named plate member, said first plate member having holes be- United States Patent [19]

Branch

[11] 4,262,944
[45] Apr. 21, 1981

[54] BROCCOLI BUNCHING AND TYING MACHINE

[75] Inventor: Gregory L. Branch, Salinas, Calif.

[73] Assignee: Johnson Associates, Inc., Salinas, Calif.

[21] Appl. No.: 27,120

[22] Filed: Apr. 4, 1979

Related U.S. Application Data

[63] Continuation-in-part of Ser. No. 7,547, Jan. 30, 1979.

[51] Int. Cl.³ .................. A01D 59/04; D04G 5/00
[52] U.S. Cl. .......................... 289/2; 53/515; 289/11
[58] Field of Search .............. 289/2, 5, 11, 18.1; 53/515, 529; 83/409.1, 409.2; 100/19 R; 198/836

[56] References Cited

U.S. PATENT DOCUMENTS

| 1,454,545 | 5/1923 | Bombard et al. | 100/19 R |
| 1,502,635 | 7/1924 | Jaeger | 198/836 X |
| 2,019,080 | 10/1935 | Johnson et al. | 53/529 X |
| 2,262,035 | 11/1941 | Noling | 289/5 X |
| 2,567,052 | 9/1951 | Carruthers | 53/529 X |
| 2,722,253 | 11/1955 | Brooks | 83/409.1 |
| 3,101,963 | 8/1963 | Sullivan et al. | 289/11 |
| 3,400,959 | 9/1968 | Grillot | 289/11 X |
| 3,568,591 | 3/1971 | Dunlap | 100/7 |
| 4,041,672 | 8/1977 | Gularte | 83/409.2 X |
| 4,095,391 | 6/1978 | Arguiano | 53/515 |

FOREIGN PATENT DOCUMENTS 2105573 4/1972 France ..................... 83/409.2

Primary Examiner—Louis Rimrodt
Attorney, Agent, or Firm—Townsend and Townsend

[57] ABSTRACT

An automatic tying machine suitable for use in connection with an automatic broccoli bunching machine is illustrated. The tying machine comprises, in addition to the string carrying needle and knotter bill mechanism of the prior art machines, a placer foot that is separate from the needle, and a string retaining mechanism having two fingers, so that each string end of the loop may be independently held.

21 Claims, 14 Drawing Figures